United States Patent
Choi et al.

(10) Patent No.: US 12,522,504 B2
(45) Date of Patent: Jan. 13, 2026

(54) 2-DIMENSIONAL MICROPOROUS GRAPHENE AND METHOD FOR PREPARING THE SAME

(71) Applicant: KOREA ADVANCED INSTITUTE OF SCIENCE AND TECHNOLOGY, Daejeon (KR)

(72) Inventors: Minkee Choi, Daejeon (KR); Chaehoon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 808 days.

(21) Appl. No.: 17/840,628

(22) Filed: Jun. 15, 2022

(65) Prior Publication Data
US 2022/0402762 A1 Dec. 22, 2022

(30) Foreign Application Priority Data
Jun. 18, 2021 (KR) .......................... 10-2021-0079429

(51) Int. Cl.
*C01B 32/186* (2017.01)
*C01B 32/182* (2017.01)

(52) U.S. Cl.
CPC .......... *C01B 32/186* (2017.08); *C01B 32/182* (2017.08); *C01B 2204/02* (2013.01);
(Continued)

(58) Field of Classification Search
CPC . C01B 32/186; C01B 32/182; C01B 2204/02; C01B 2204/32; C01B 2204/20; C01B 32/184; C01B 32/188; C01B 32/19; C01B 32/192; C01B 32/194; C01B 32/196; C01B 32/198; C01B 2204/00; C01B 2204/04; C01B 2204/06; C01B 2204/065; C01B 2204/22; C01B 2204/24; C01B 2204/26; C01B 2204/28; C01B 2204/30; C01B 32/20; C01B 32/205; C01B 32/21; C01B 32/215; C01B 32/22; C01B 32/225;
(Continued)

(56) References Cited

U.S. PATENT DOCUMENTS 9,012,882 B2 4/2015 Duan et al.
2017/0036911 A1* 2/2017 Swett ...................... C23C 16/56

FOREIGN PATENT DOCUMENTS

KR 10-1611173 B1 4/2016
KR 10-2017-0079718 A 7/2017
(Continued)

OTHER PUBLICATIONS

Nishihara, et al., Zeolite-templated carbons—three-dimensional microporous graphene frameworks, Chem. Commun. 2018; 54: 5648-5673 (Year: 2018).*
(Continued)

*Primary Examiner* — Daniel C. Mccracken
(74) *Attorney, Agent, or Firm* — CANTOR COLBURN LLP (57) ABSTRACT

Provided are a 2-dimensional microporous graphene and a method for preparing the same. The 2-dimensional microporous graphene has an average pore size of about 0.1 nm to about 2 nm, interpore spacing of about 0.3 nm to about 10 nm, and a standard deviation of the interpore spacing of less than or equal to about 5 nm.

14 Claims, 12 Drawing Sheets

(52) U.S. Cl.
CPC ...... *C01B 2204/32* (2013.01); *C01P 2002/01* (2013.01); *C01P 2002/20* (2013.01); *C01P 2002/72* (2013.01); *C01P 2006/16* (2013.01); *C01P 2006/17* (2013.01)

(58) Field of Classification Search
CPC .. C01B 32/23; C01P 2002/01; C01P 2002/20; C01P 2002/72; C01P 2006/16; C01P 2006/17; C01P 2002/52; C01P 2004/20
See application file for complete search history.

(56) References Cited

FOREIGN PATENT DOCUMENTS

| KR | 10-2018-0059135 A | 6/2018 |
| --- | --- | --- |
| KR | 20180103260 A | 9/2018 |
| KR | 102035397 B1 | 10/2019 |
| KR | 102185849 B1 | 12/2020 |

OTHER PUBLICATIONS

Roth, et al., Two-Dimensional Zeolites: Current Status and Perspectives, Chem. Rev. 2014; 114: 4807-4837 (Year: 2014).*
G. Liu et al., "Graphene-based Membranes," Chem. Soc. Rev., 2015, 13 pages, The Royal Society of Chemistry.
Baoxia Mi, "Scaling up nanoporous graphene membranes," Science, 2019, pp. 1033-1034, vol. 364, Issue 6445.
Sean C O'hern et al., "Selective Ionic Transport through Tunable Sub-Nanometer Pores in Single-Layer Graphene Membranes," Nano Letters, 2014, pp. 26 pages, American Chemical Society.
Kemal Celebi et al., "Ultimate Permeation Across Atomically Thin Porous Graphene," Science, 2014, pp. 289-292, vol. 344.
Sumedh P. Surwade et al., "Water desalination using nanoporous single-layer graphene, " Nature Nanotechnology, 2015, 6 pages, Macmillan Publishers Limited.
Y. Xu et al., "Holey graphene frameworks for highly efficient capacitive energy storage," Nature Communications, 2014, 8 pages, Macmillan Publishers Limited.
Hongtao Sun et al., "Three-dimensional holey-graphene/niobia composite architectures for ultrahigh-rate energy storage," Science, 2017, pp. 599-604.
C. Moreno et al., "Bottom-up synthesis of multifunctional nanoporous graphene," Science, 2018, pp. 199-203.
J. Zhou et al., "Synthesis of Graphdiyne Nanowalls using Acetylenic Coupling Reaction," Journal of the American Chemical Society, 2015, 5 pages.
X. Gao et al., "Graphdiyne: synthesis, properties, and applications," Chem. Soc. Rev. 2019, pp. 908-936, The Royal Society of Chemistry.
K. Kim et al., "Lanthanum-catalysed synthesis of microporous 3D graphene-like carbons in a zeolite template," Nature, 2016, vol. 535, Macmillan Publishers Limited.
S. Choi et al., "Large-Scale Synthesis of High-Quality Zeolite-Templated Carbons without Depositing External Carbon Layers," Chemical Engineering Journal, 2015, pp. 597-605.
S. Choi et al., "Unique thermal contraction of zeolite-templated carbons enabling micropore size tailoring and its effects on methane storage," Carbon 141, 2019, pp. 143-153.
Sungwon Hong et al., "Healing of Microdefects in SSZ-13 Membranes via Filling with Dye Molecules and Its Effect on Dry and Wet $CO_2$ Separations," Chemistry of Materials, 2018, pp. 3346-3358, American Chemical Society.
Zhixin Ma et al., "Very High Surface Area Microporous Carbon with a Three-Dimensional Nano-Array Structure: Synthesis and Its Molecular Structure," Chem. Mater., 2001, pp. 4413-4415, vol. 13, No. 12.
H. Nishihara et al., "Zeolite-templated carbons—three-dimensional microporous graphene frameworks," Chem. Commun., 2018, pp. 5648-5673, vol. 54, No. 45, The Royal Society of Chemistry.

* cited by examiner

2-DIMENSIONAL MICROPOROUS GRAPHENE AND METHOD FOR PREPARING THE SAME

CROSS-REFERENCE TO RELATED APPLICATION

This application claims priority to and the benefit of Korean Patent Application No. 10-2021-0079429 filed in the Korean Intellectual Property Office on Jun. 18, 2021, the entire contents of which are incorporated herein by reference.

BACKGROUND OF THE INVENTION

(a) Field of the Invention

A 2-dimensional microporous graphene and a method for preparing the same are disclosed.

(b) Description of the Related Art

Graphene is a carbon material in the form of an ultra-thin film with an atom thickness, which has excellent mechanical rigidity and high chemical stability, and thus is drawing attention in various fields. However, since the graphene is impermeable to all molecules and ions, in order to use the graphene as a separator material, structural design such as forming pores or passages is essential.

A conventional method for preparing microporous graphene with several nanometer-sized pores includes a top-down method and a bottom-up method. The top-down method may include a method of forming defects in the graphene by using ion bombardment, UV, plasma, and the like but has limitations such as formation of nonuniform-sized pores, low pore density ranging to about 1 pore/100 $nm^2$ and the like, and difficulty in mass production. In addition, there is an oxidation etching method of treating the graphene with hydrogen peroxide and the like, which may form many pores but nonuniform-sized and irregular pores, and also has many defects and thus lower conductivity. The bottom-up method is a method of synthesizing a precursor and then polymerizing or synthesizing it into microporous graphene, but is complicated and uneconomical from synthesizing the precursor itself to preparing the graphene, and in addition, the graphene has too high a defect density to use as a large area membrane.

On the other hand, Non-Patent Reference 1 and the like disclose a method of preparing microporous carbon with a 3-dimensional structure by depositing carbon on a 3-dimensional zeolite skeleton carbon and then selectively removing the zeolite. Afterwards, studies on carbon materials using a 3-dimensional zeolite mold have been presented, which are to synthesize carbon materials with a 3-dimensional structure such as a ribbon shape, a tube shape, and the like. However, the carbon materials with a 3-dimensional structure have too high an aspect ratio to be used as a membrane. [Non-Patent Document 1] T. Kyotani et al., Chem. Mater. 13, 4413 (2001)

SUMMARY OF THE INVENTION

Provided are 2-dimensional microporous graphene in which nanopores of uniform size are regularly present and a method of preparing 2-dimensional microporous graphene using a zeolite mold.

An embodiment provides a 2-dimensional microporous graphene having an average pore size of about 0.1 nm to about 2 nm, interpore spacing of about 0.3 nm to about 10 nm, and a standard deviation of the interpore spacing of less than or equal to about 5 nm.

Another embodiment provides a method for preparing a 2-dimensional microporous graphene that includes depositing carbon on a zeolite mold having a 2-dimensional pore structure to prepare a carbon-zeolite composite, and removing the zeolite from the carbon-zeolite composite with a leaching solution.

Microporous graphene having a 2-dimensional structure according to an embodiment is a material having a uniform pore size, interpore spacing, and a moderately high pore density, and is capable of doping with various hetero elements, and may be used for energy storage materials such as electrode active materials, electronic materials such as quantum dots, various membranes or films such as separators, chemical detectors, and various catalysts. In addition, the preparing method according to an embodiment is simple, economical, and advantageous for mass production.

DETAILED DESCRIPTION OF THE EMBODIMENTS

Hereinafter, embodiments of the present invention are described in detail so that those of ordinary skill in the art can easily implement the present invention. However, this disclosure may be embodied in many different forms and is not construed as limited to the example embodiments set forth herein.

Hereinafter, "combination thereof" refers to a mixture, a laminate, a composite, a copolymer, an alloy, a blend, or a reaction product of constituents.

Herein, it should be understood that terms such as "comprises," "includes," or "have" are intended to designate the presence of an embodied feature, number, step, element, or a combination thereof, and it does not preclude the possibility of the presence or addition of one or more other features, number, step, element, or a combination thereof.

2-Dimensional Microporous Graphene

An embodiment provides a 2-dimensional microporous graphene having an average pore size of about 0.1 nm to about 2 nm, interpore spacing of about 0.3 nm to about 10 nm, and a standard deviation of the interpore spacing of less than or equal to about 5 nm.

The graphene has a 2-dimensional structure such as a sheet form, unlike graphene having a 3-dimensional structure such as a conventional ribbon form and tube form. The graphene having the 2-dimensional structure may exist in a sheet form having an atomic thickness. Two or more of these sheets may be laminated to exist in a laminated structure, and the thickness of the laminated structure may be, for example, about 3 nm to about 10 nm. Microporous graphene having such a 2-dimensional structure is advantageous for application to various separators or electrode materials.

Herein, the microporous graphene may refer to graphene having pores of less than or equal to about 2 nm. That is, in graphene, micro-pores may mean pores having a size of less than or equal to about 2 nm.

Microporous graphene according to an embodiment is graphene having a 2-dimensional structure in which pores having a size of 0.1 nm to 2 nm are present. An average pore size may be, for example, about 0.1 nm to about 1.9 nm, about 0.1 nm to about 1.8 nm, about 0.1 nm to about 1.7 nm, about 0.1 nm to about 1.6 nm, about 0.1 nm to about 1.5 nm, about 0.1 nm to about 1.4 nm, about 0.1 nm to about 1.3 nm, about 0.1 nm to about 1.2 nm, about 0.1 nm to about 1.1 nm, about 0.2 nm to about 1.0 nm, about 0.3 nm to about 0.9 nm, or about 0.4 nm to about 0.8 nm. When the average pore size satisfies these ranges, the 2-dimensional microporous graphene is advantageous in selectively permeating molecules or ions, and thus may be used in various fields.

The pores as 2-dimensional pores may be in the form of a circle, an ellipse, a polygon, etc., and for example, may have a shape substantially close to a circle. The pore size may mean a diameter if the pores are circular, and may mean the longest length of lengths corresponding to the diameters or a length of the longest axis if the pores are not circular. In addition, the pore size may be measured through a picture taken with an optical microscope such as a scanning electron microscope or a transmission electron microscope. The average size may be an arithmetic average value of sizes measured by optical microscope images. For example, the average pore size may be derived by measuring the size of 50 or 100 arbitrary pores in an optical microscope image and calculating an arithmetic average value thereof.

The 2-dimensional microporous graphene according to an embodiment according to an embodiment has very uniform pores. For example, a standard deviation of the average pore size may be less than or equal to about 1 nm, for example less than or equal to about 0.9 nm, less than or equal to about 0.8 nm, less than or equal to about 0.7 nm, less than or equal to about 0.6 nm, less than or equal to about 0.5 nm, less than or equal to about 0.4 nm, less than or equal to about 0.3 nm, less than or equal to about 0.2 nm, less than or equal to about 0.1 nm, less than or equal to about 0.09 nm, or less than or equal to about 0.08 nm and greater than or equal to about 0.001 nm or greater than or equal to about 0.01 nm. As described above, when the standard deviation of the average pore size is small, that is, when the pore size is very uniform, performance of selectively permeating molecules or ions is excellent, and thus it is advantageous for application to various membranes or electrode materials.

In the 2-dimensional microporous graphene according to an embodiment, the spacing between the pores is in an appropriate range without being too narrow or too wide, and the spacing is very regular. Specifically, the average spacing between the pores may be about 0.3 nm to about 10 nm, and the standard deviation thereof may be less than or equal to about 5 nm. Here, the interpore spacing may mean a distance from the center of the pores to the center of the adjacent pores. The average spacing between the pores may be an arithmetic average value of the spacing measured by an optical microscope image or the like. For example, an average interpore spacing may be derived by measuring the spacing between 50 or 100 arbitrary pores in an optical microscope image and calculating their arithmetic average values and standard deviations. Alternatively, the spacing between the pores may be measured through X-ray spectroscopic analysis (X-ray Diffraction; XRD). This will be described in detail in Evaluation Example 3.

The spacing between the pores may be, for example, about 0.3 nm to about 10 nm, about 0.3 nm to about 9 nm, about 0.3 nm to about 8 nm, about 0.3 nm to about 7 nm, about 0.3 nm to about 6 nm, about 0.4 nm to about 5 nm, about 0.5 nm to about 4 nm, about 0.6 nm to about 3 nm, about 0.8 nm to about 2 nm, or about 1.0 nm to about 1.5 nm. Microporous graphene having the interpore spacing that satisfies the above ranges may have an appropriate pore density, may be effective in selectively permeating various molecules or ions, and thus may be advantageous for application in various fields.

The standard deviation for the interpore spacing may be, for example, less than or equal to about 5 nm, less than or equal to about 4 nm, less than or equal to about 3 nm, less than or equal to about 2 nm, less than or equal to about 1 nm, less than or equal to about 0.5 nm, less than or equal to about 0.1 nm, or less than or equal to about 0.08 nm, and greater than or equal to about 0.001 nm or greater than or equal to about 0.01 nm. When the standard deviation for the interpore spacing is small as described above, the interpore spacing is very regular, and this microporous graphene is effective in selectively permeating molecules or ions, and thus it may be used in various fields such as separators and electrode materials.

In the 2-dimensional microporous graphene, the pore density may be about 10 pores/100 $nm^2$ to about 100 pores/100 $nm^2$, for example, about 20 pores/100 $nm^2$ to about 100 pores/100 $nm^2$, about 30 pores/100 $nm^2$ to about 100 pores/100 $nm^2$, about 40 pores/100 $nm^2$ to about 90 pores/100 $nm^2$, or about 50 pores/100 $nm^2$ to about 80 pores/100 $nm^2$. When the pore density satisfies these ranges, the 2-dimensional microporous graphene may be effective in selectively permeating molecules or ions, and may be suitable for application to various separators or electrode materials.

The 2-dimensional microporous graphene may exhibit a peak at a 2θ value of about 7.2° and/or about 7.6° in X-ray spectroscopic analysis (X-ray diffraction; XRD). The interlayer spacing (d-spacing) at 2θ values of about 7.2° and about 7.6° may be about 1.23 nm and about 1.16 nm, respectively. This peak proves that nanopores of uniform size are regularly formed in the 2-dimensional microporous graphene. This will be described in detail in Evaluation Example 1 and FIG. 5.

Meanwhile, the 2-dimensional microporous graphene has many edge sites, and thus it is possible to introduce various functional groups. The size of the effective pores and the polarity of the surface may be controlled according to the type and amount of functional groups introduced.

In an embodiment, 2-dimensional microporous graphene doped with oxygen, sulfur, nitrogen, or a combination thereof is provided. Here, the doping amount may be about 0.1 wt % to about 20 wt %, for example, about 1 wt % to about 10 wt %, based on 100 wt % of the microporous graphene. That is, the 2-dimensional microporous graphene may include about 0.1 wt % to about 20 wt % of nitrogen, about 0.1 wt % to about 20 wt % of sulfur, and/or about 0.1 wt % to about 20 wt % of oxygen. For example, the 2-dimensional microporous graphene may be doped with oxygen, sulfur, nitrogen, or a combination thereof, thereby reducing effective pores and increasing surface polarity. Conversely, in the 2-dimensional microporous graphene, edge sites may be substituted with hydrogen, and in this case, effective pores may increase and surface polarity may decrease. The pore size and surface polarity may be variously controlled according to desired properties in the field of application.

Method for Preparing 2-Dimensional Microporous Graphene

Figure 1:
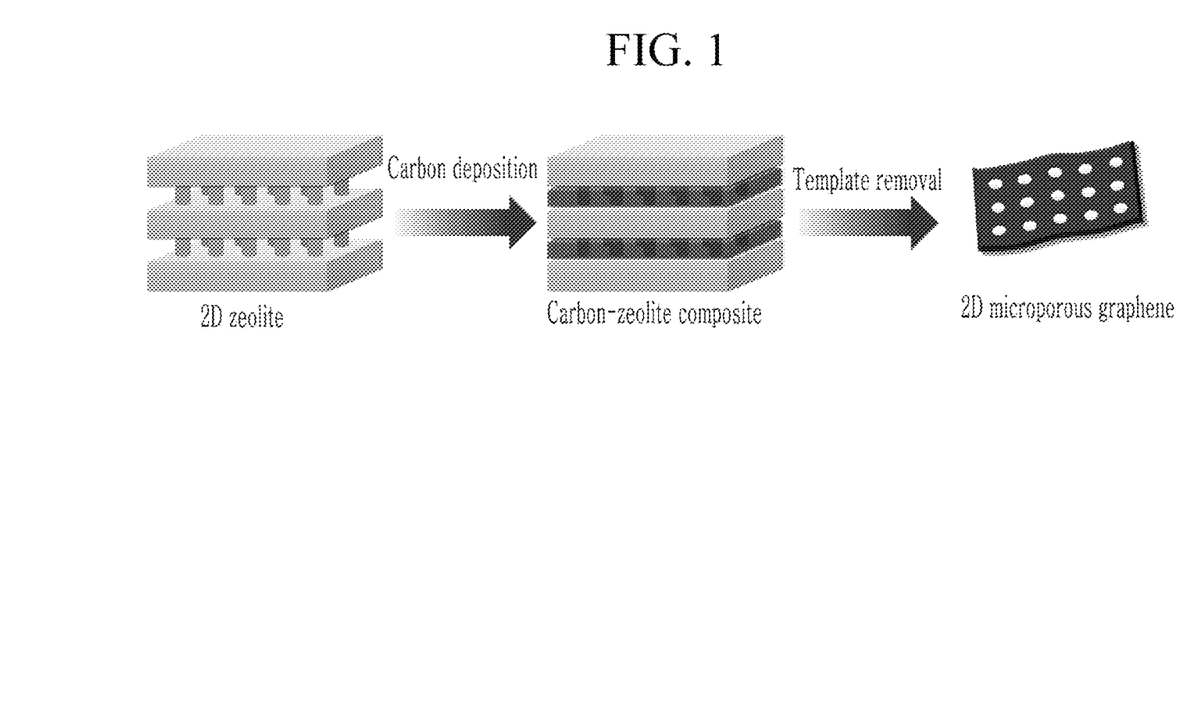
FIG. 1 is a view showing a method of preparing 2-dimensional microporous graphene according to an embodiment.

In an embodiment, a method for preparing 2-dimensional microporous graphene includes depositing carbon on a zeolite mold having a 2-dimensional pore structure to prepare a carbon-zeolite composite, and removing the zeolite from the carbon-zeolite composite with a leaching solution. A preparing method according to an embodiment is shown in FIG. 1 for better understanding. This preparing method is simple, economical, and advantageous for mass production.

Since the 2-dimensional pore structure has a disadvantage in diffusion of the carbon precursor compared to the 3-dimensional pore structure, it is important to select a zeolite mold when synthesizing the 2-dimensional microporous graphene. That is, it is necessary to use a 2-dimensional zeolite mold having micro-pores of an appropriate size for uniform carbon deposition. The zeolite mold used in an embodiment may have a 2-dimensional pore structure, and the pores may have a size of a 10-membered ring (MR) or more. When using a zeolite mold having 2-dimensional pores that are smaller than a 10-membered ring, growth of an $sp^2$ hybridized carbon skeleton may be disadvantageous while when using a zeolite mold having 2-dimensional pores with a size of a 10-membered ring or more, microporous graphene with regular nanopores may be effectively synthesized.

The size of the 2-dimensional pores in the zeolite mold may be a 10-membered ring or more, an 11-membered ring or more, or a 12-membered ring or more, or a 30-membered ring or more, and a 20 membered ring or less. When the zeolite mold having a pore size that satisfies the above ranges is used, the 2-dimensional microporous graphene may be successfully synthesized.

The zeolite mold may specifically be at least one selected from *CTH, EWS, IWV, MWW, NES, OKO, *PCS, SEW, SFG, SFS, SSF, TER, USI, and UTL. In other words, when the zeolite mold with the exemplified structure is used, the aforementioned 2-dimensional microporous graphene may be effectively synthesized.

The carbon deposition may be performed, for example, through a chemical deposition method. For example, the carbon deposition may be performed by supplying a carbon precursor including acetylene, ethylene, propylene, ethanol, or a combination thereof to the zeolite mold. Herein, the carbon precursor may be supplied with helium gas. In other words, the carbon deposition may be performed under a helium gas atmosphere. In addition, the carbon deposition may be performed, for example, within a temperature range of about 573 K to about 1273 K for about 1 hour to about 48 hours.

On the other hand, when the carbon is deposited on the zeolite mold, a nitrogen precursor and/or a sulfur precursor may be additionally supplied. Herein, 2-dimensional microporous graphene doped with nitrogen and/or sulfur may be prepared.

The nitrogen precursor may include, for example, ammonia, methyl amine, ethyl amine, propyl amine, butyl amine, acetonitrile, pyrrole, pyridine, or a combination thereof. The sulfur precursor may include hydrogen sulfide, thiophene, thiophenol, mercaptoethanol, thioacetic acid, methyl mercaptan, ethyl mercaptan, propyl mercaptan, butyl mercaptan, or a combination thereof. The additional supply of the nitrogen precursor and/or the sulfur precursor may be to supply in a content range such that the content of each of nitrogen and/or sulfur may be about 0.1 wt % to about 20 wt % based on the total weight of the final 2-dimensional microporous graphene, respectively.

After depositing carbon on the zeolite mold, a heat treatment may be performed, which may be a carbonization process. The heat treatment may be performed, for example, within a temperature range of about 773 K to about 1323 K for about 30 minutes to about 10 hours or about 30 minutes to about 5 hours under the helium atmosphere.

Then, only the zeolite mold may be selectively removed through the process of putting the obtained carbon-zeolite composite into the leaching solution and stirring. The leaching solution may include, for example, HCl, NaOH, KOH, HF, NaF, $NH_4F$, $AlF_3$, or a combination thereof. The leaching solution may be an aqueous solution containing 0.1 wt % to 5 wt % of at least one of the exemplified compounds. The stirring may be performed for, for example, about 10 minutes to about 120 minutes. Then, a process of drying the material obtained by selectively removing the zeolite mold may be additionally performed.

On the other hand, after preparing the microporous graphene, the microporous graphene may be additionally treated with oxygen ($O_2$) or hydrogen ($H_2$) gas. Herein, the 2-dimensional microporous graphene in which etch sites are substituted with the oxygen or hydrogen may be prepared, appropriately adjusting a size of effective pores and surface polarity.

In this way, the zeolite mold may be selectively removed to obtain the 2-dimensional microporous graphene. The obtained 2-dimensional microporous graphene exhibits the same structural characteristics as described above. In other words, the prepared 2-dimensional microporous graphene has pores of about 0.1 nm to about 2 nm, a uniform size of the pores, regular interpore spacing, and pore density of about 10 to about 100 pores/100 $nm^2$. This 2-dimensional microporous graphene has excellent performance of selectively penetrating molecules or ions and accordingly may be variously used as an energy storage material such as an electrode active material and the like; an electron material such as a quantum dot and the like; various membranes such as a separator and the like; a film; a chemical detector; and a catalyst and the like.

Hereinafter, examples, comparative examples, and evaluation examples thereof of the present invention are described. The following examples are only examples of the present invention, and the present invention is not limited to the following examples.

Example 1

An IWV zeolite mold having a 2-dimensional pore structure consisting of 12-membered rings (12 MRs) is injected into a quartz reactor and then heated to 773 K, while supplying helium gas. A mixed gas of ethylene (20 volume %) and helium is supplied at 200 mL/min for 2 hours to deposit carbon on the zeolite mold in a chemical vapor deposition method. Subsequently, a heat treatment is performed at 1273 K, while helium gas is supplied at 200 mL/min, and after the temperature is stabilized, the heat treatment further proceeds for 2 hours. Then, the resultant is cooled to room temperature under a helium atmosphere, obtaining a carbon-zeolite composite. This composite is stirred in a 1.1 wt % HCl and 0.8 wt % HF aqueous solution for 1 hour to remove the zeolite mold and then dried at 373 K for 24 hours, completing synthesis of 2-dimensional microporous graphene.

Example 2

2-dimensional microporous graphene is prepared in the same manner as Example 1 except that an UTL zeolite mold is used as the zeolite mold having a 2-dimensional pore structure.

Example 3

2-dimensional microporous graphene is prepared in the same manner as Example 1 except that when the ethylene gas is supplied, and hydrogen sulfide (5 volume % in helium) is also supplied at 80 mL/min.

Example 4

2-dimensional microporous graphene is prepared in the same manner as Example 1 except that when the ethylene gas is supplied, ammonia (5 volume % in helium) is supplied at 80 mL/min.

Comparative Example 1

2-dimensional microporous graphene is prepared in the same manner as Example 1 except that an FER zeolite mold having a 2-dimensional pore structure consisting of a 10-membered ring (10 MR) and an 8-membered ring (8 MR) is used.

Evaluation Example 1: Structure Analysis

Figure 2:
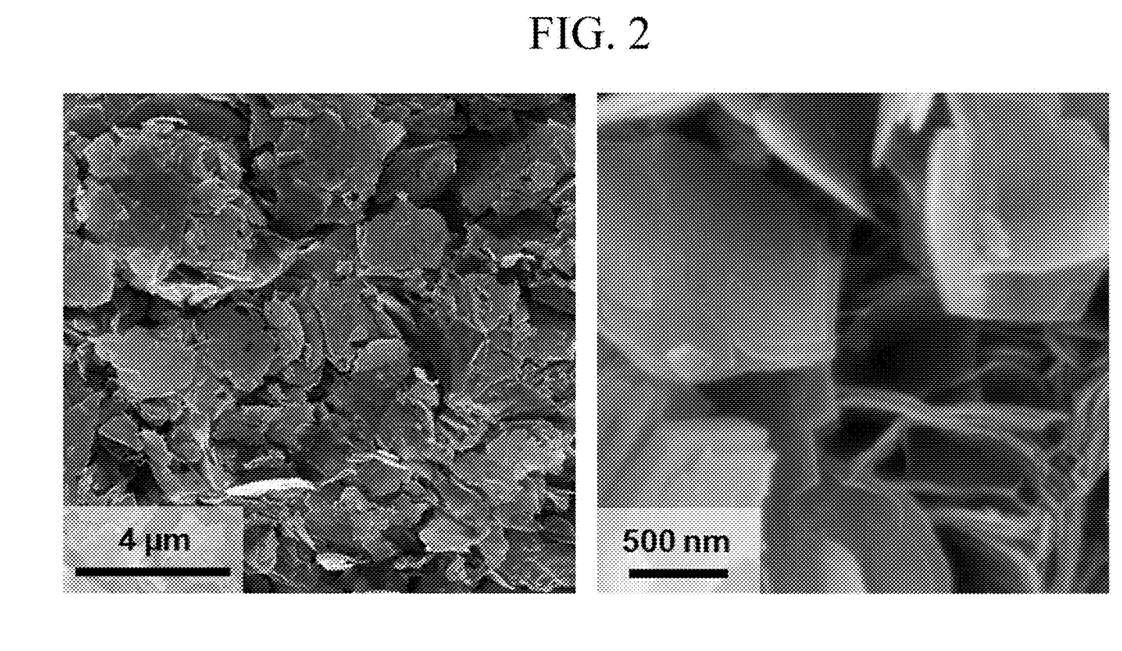
FIG. 2 is a scanning electron microscope (SEM) image of the 2-dimensional microporous graphene prepared in Example 1.

FIG. 2 is a scanning electron microscope (SEM) image of the 2-dimensional microporous graphene prepared in Example 1. Referring to FIG. 2, graphene in the form of leaves featured in the 2-dimensional structure is prepared.

Figure 3:
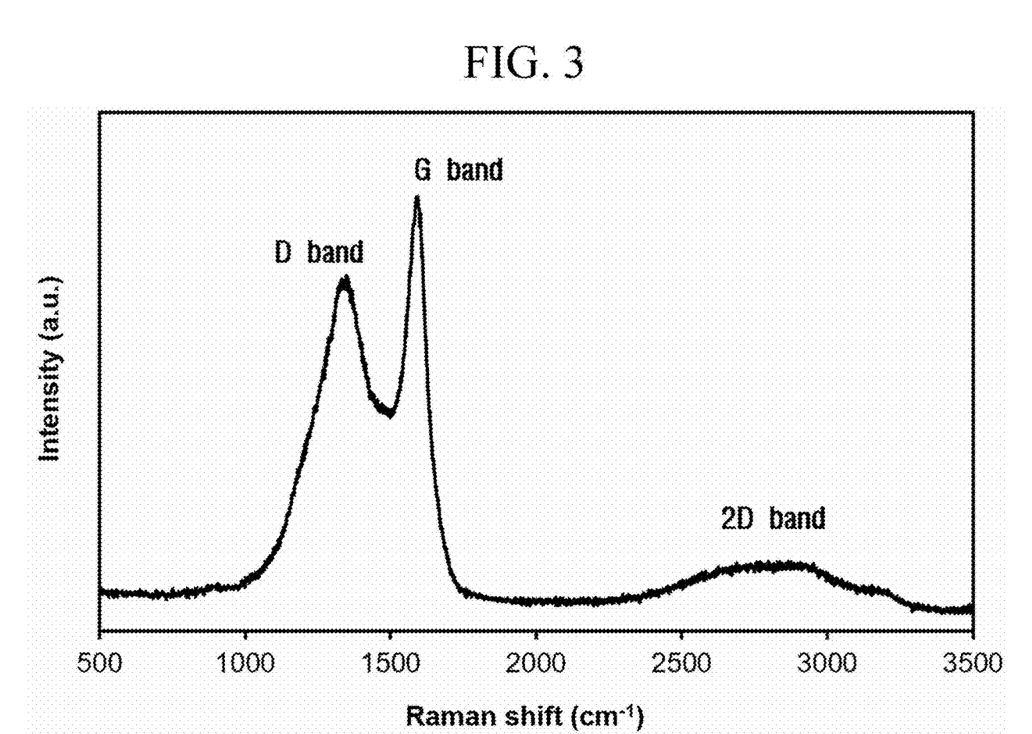
FIG. 3 is a Raman analysis (Raman) graph for the 2-dimensional microporous graphene prepared in Example 1.

FIG. 3 is a Raman analysis graph showing the 2-dimensional microporous graphene prepared in Example 1. Peaks shown in FIG. 3 prove that the synthesized material is graphene with a 2-dimensional structure, in which edge sites are rich.

Figure 4:
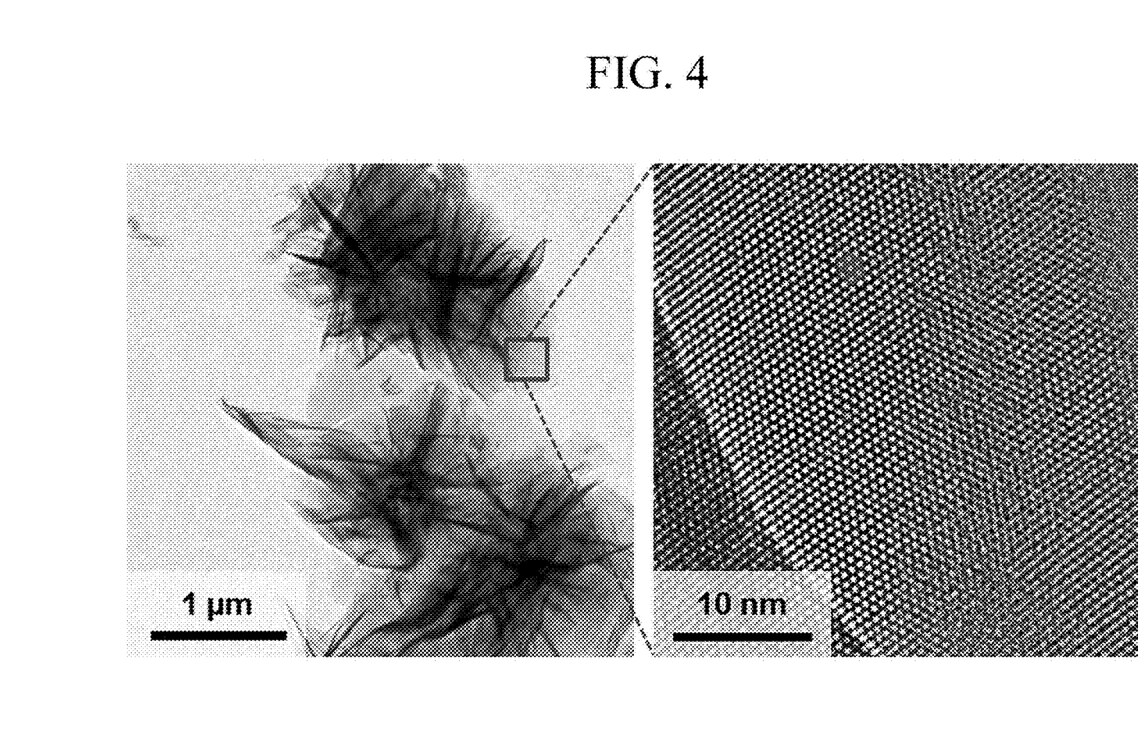
FIG. 4 is a transmission electron microscope (TEM) image of the 2-dimensional microporous graphene prepared in Example 1.

FIG. 4 is a transmission electron microscope (TEM) image showing the 2-dimensional microporous graphene prepared in Example 1. Referring to FIG. 4, pores of the 2-dimensional structure are very regularly formed in the graphene. In addition, as an analysis result through FIG. 4, the pores in the synthesized graphene have density of approximately 70 pores/100 $nm^2$.

Figure 5:
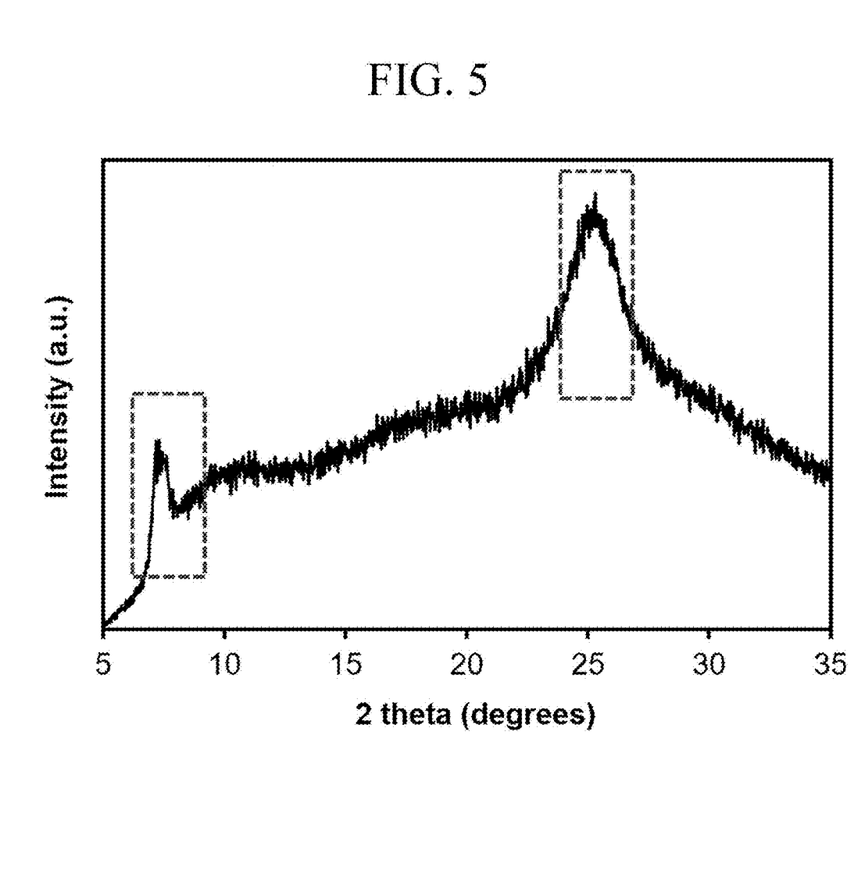
FIG. 5 is an X-ray spectroscopic analysis (XRD) graph of the 2-dimensional microporous graphene prepared in Example 1.

FIG. 5 is an X-ray spectroscopic analysis (XRD) graph of the 2-dimensional microporous graphene prepared in Example 1. In FIG. 5, a dotted box at the right where 2θ is 25° shows that a peak due to an interlayer of the stacked graphenes. In addition, a dotted box at the left where 2θ is 7.2° and 7.6° shows that a peak is caused by a space between the pores. These peaks indicate that the micro-pores are very uniformly arranged within the same layer.

Evaluation Example 2: Evaluation of Pore Size

Figure 6:
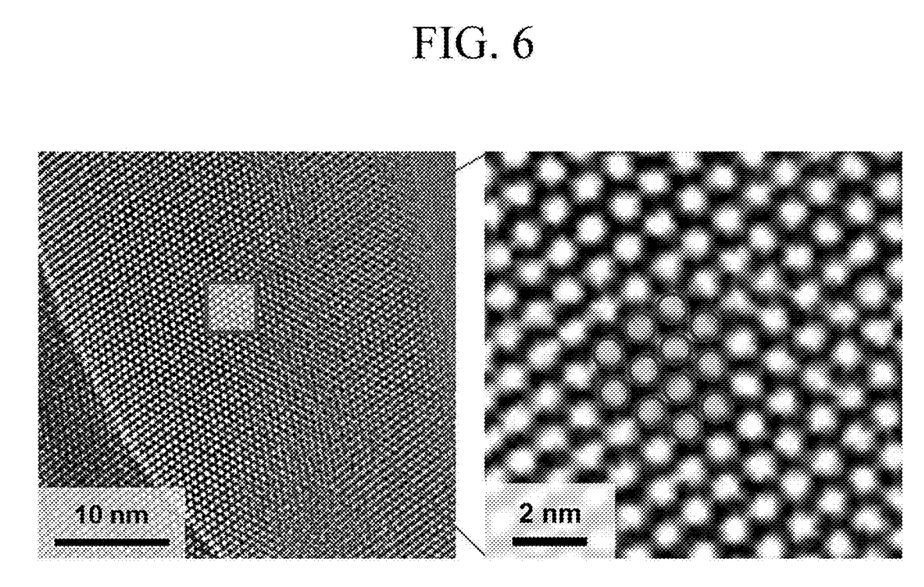
FIG. 6 is a TEM image of 2-dimensional microporous graphene prepared in Example 1.
Figure 7:
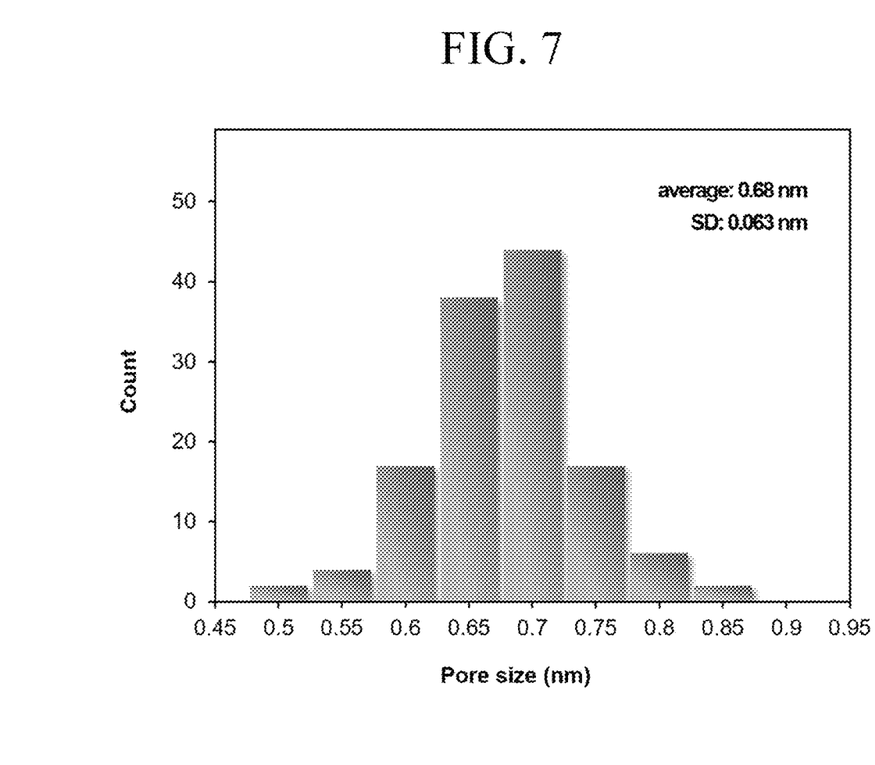
FIG. 7 is a graph analyzing the pore sizes measured through FIG. 6.

The pore size may be measured using a TEM image. FIG. 6 is a TEM image of the 2-dimensional microporous graphene prepared in Example 1. After arbitrarily selecting bout 100 pores in FIG. 6, each pore size is measured, and the results are shown in a graph of FIG. 7, wherein an arithmetic mean of each pore size is 0.68 nm, and a standard deviation thereof is 0.063 nm.

Evaluation Example 3: Evaluation of Interpore Spacing

Figure 8:
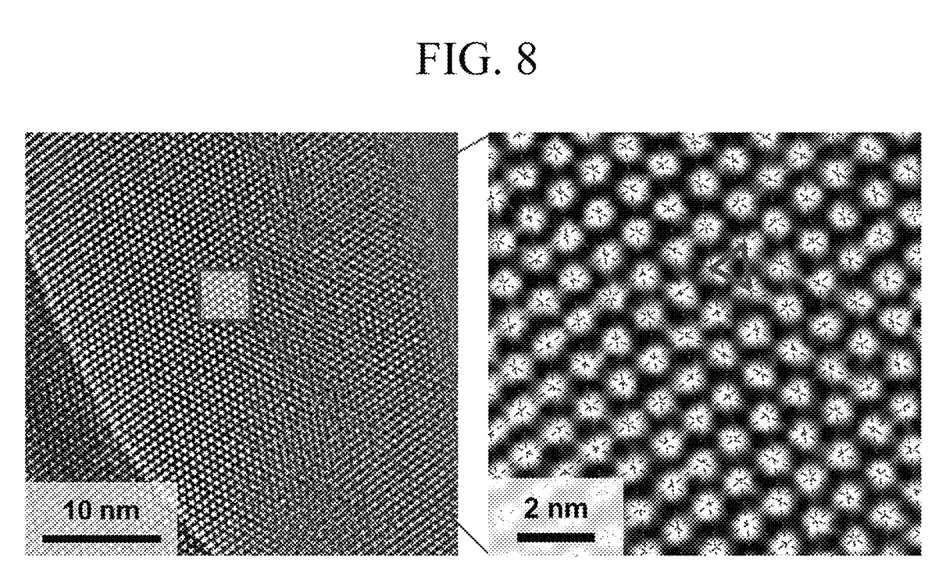
FIG. 8 is a TEM image of the 2-dimensional microporous graphene prepared in Example 1.
Figure 9:
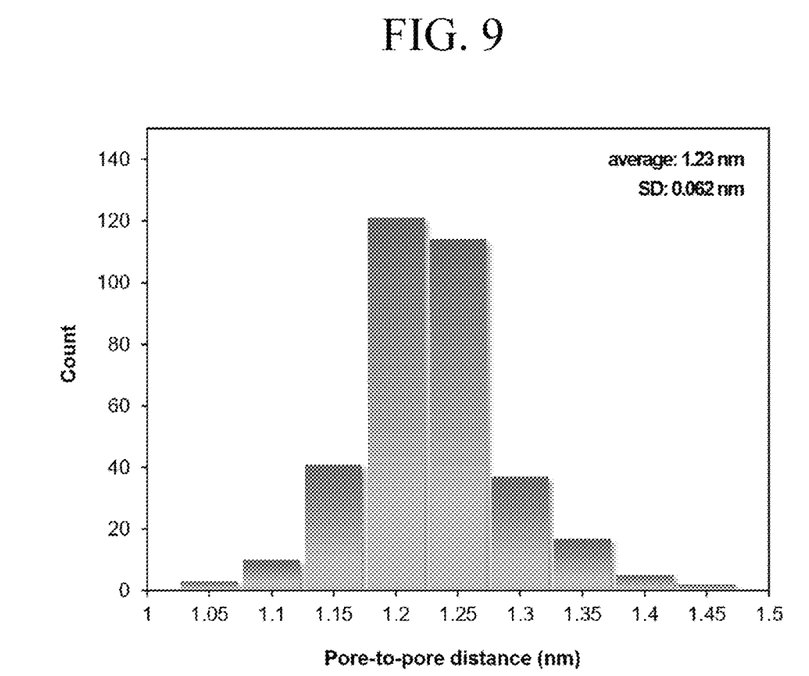
FIG. 9 is a graph analyzing the interpore spacing measured through FIG. 8.

The interpore spacing may be measured using a TEM image. FIG. 8 is a TEM image of the 2-dimensional microporous graphene prepared in Example 1. In FIG. 8, about 100 random spacings from the center of one pore to the center of the neighboring pore are measured, and the results are shown in FIG. 9, wherein an arithmetic means of the interpore spacings is 1.23 nm, and a standard deviation thereof is 0.062 nm.

Figure 10:
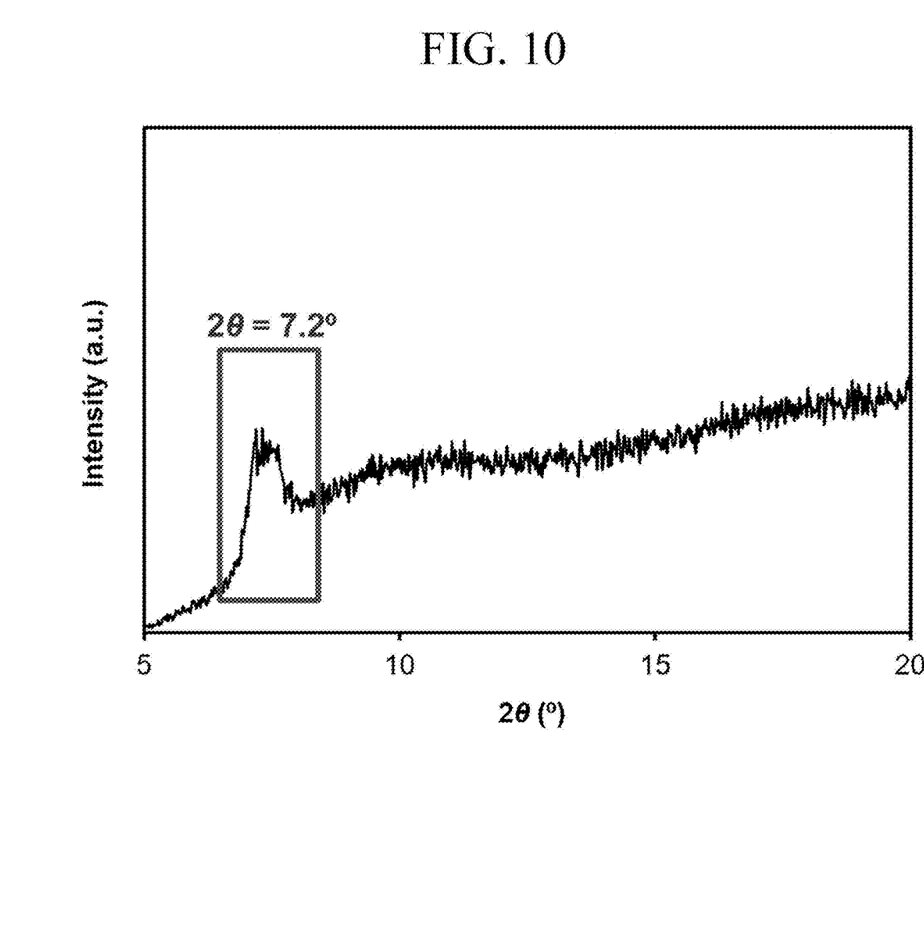
FIG. 10 is an XRD graph of 2-dimensional microporous graphene prepared in Example 1.

The interpore spacing may also be obtained through an XRD graph. FIG. 10 is an XRD graph of 2-dimensional microporous graphene prepared in Example 1. In FIG. 10, 2θ where a peak is observed is 7.2°, which corresponds to θ=3.6. An average spacing from the center of a pore to the center of the neighboring pore may be calculated into $\lambda/2 \sin\theta$, and a result of calculating 0.15418/2 sin(3.60) is confirmed to be 1.23 nm.

Evaluation Example 4: Structural Evaluation of Comparative Example 1

Figure 11:
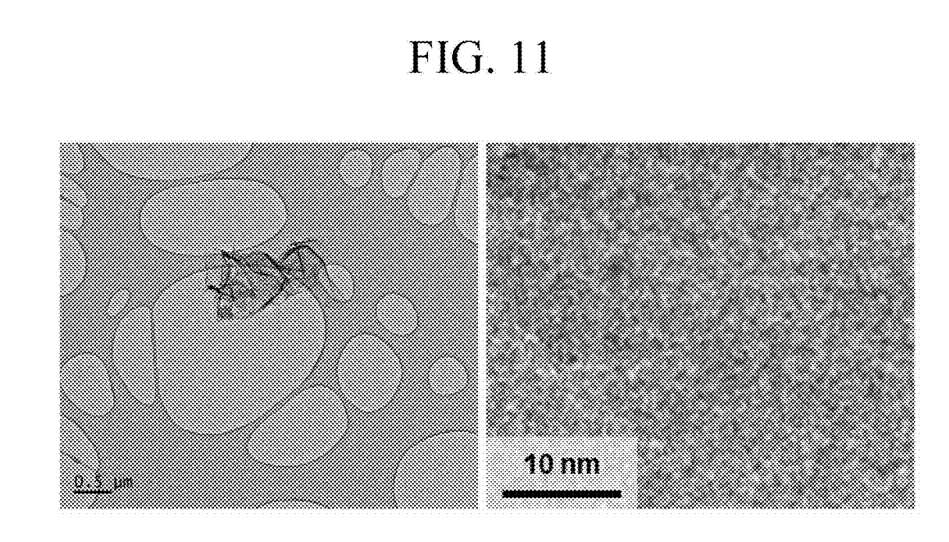
FIG. 11 is a TEM image of the microporous graphene prepared in Comparative Example 1.
Figure 12:
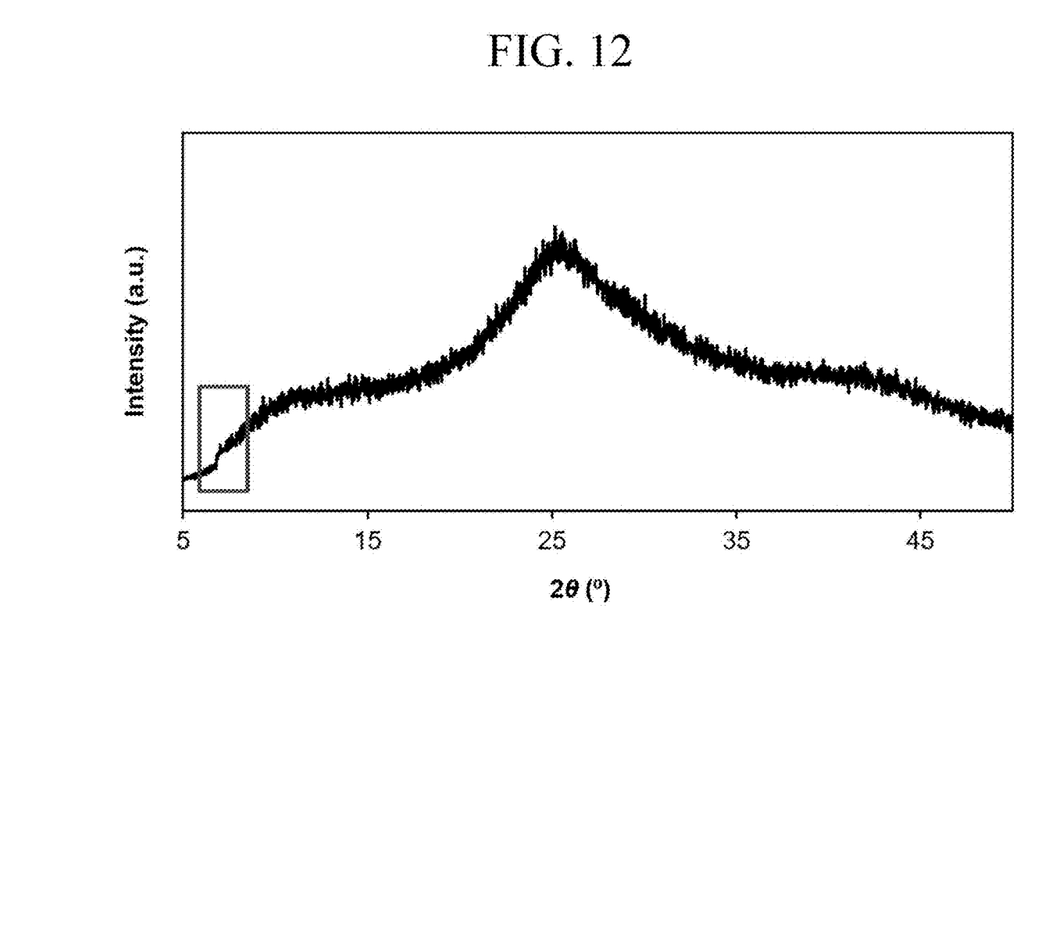
FIG. 12 is an XRD graph of the microporous graphene prepared in Comparative Example 1.

FIG. 11 is a TEM image of the microporous graphene prepared in Comparative Example 1. Referring to FIG. 11, in Comparative Example 1, regular micro-pores are not formed. FIG. 12 is an XRD graph of the microporous graphene prepared in Comparative Example 1, in which no peak is observed at 2θ=7.2°, and no regular micro-pores are formed. The FER zeolite having a 2-dimensional pore structure consisting of a 10-membered ring and an 8-membered ring has so small-sized pores that an $sp^2$ hybridized carbon skeleton may not grow, failing in forming the micropores. In order to grow the continuous $sp^2$ carbon skeleton inside the 2-dimensional zeolite pores, it is advantageous to use a 2-dimensional zeolite composed of micro-pores with a size of a 10-membered ring or more.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A 2-dimensional microporous graphene having
an average pore size of about 0.1 nm to about 2 nm,
interpore spacing of about 0.3 nm to about 10 nm, and
a standard deviation of the interpore spacing of less than or equal to about 5 nm.

2. The 2-dimensional microporous graphene of claim 1, wherein
a standard deviation of the average pore size is less than or equal to about 1 nm.

3. The 2-dimensional microporous graphene of claim 1, wherein
a pore density is about 10 pores/100 $nm^2$ to about 100 pores/100 $nm^2$.

4. The 2-dimensional microporous graphene of claim 1, wherein
the microporous graphene is doped with oxygen, sulfur, nitrogen, or a combination thereof.

5. The 2-dimensional microporous graphene of claim 4, wherein
a doping amount is about 0.1 wt % to about 20 wt % based on 100 wt % of the microporous graphene.

6. A method for preparing a 2-dimensional microporous graphene, comprising
depositing carbon on a zeolite mold having a 2-dimensional pore structure to prepare a carbon-zeolite composite, and
removing the zeolite from the carbon-zeolite composite with a leaching solution.

7. The method of claim 6, wherein
the zeolite mold has a 2-dimensional pore structure having a 10-membered ring or more.

8. The method of claim 6, wherein
the zeolite mold is at least one of *CTH, EWS, IWV, MWW, NES, OKO, *PCS, SEW, SFG, SFS, SSF, TER, USI, or UTL.

9. The method of claim 6, wherein
depositing of the carbon is depositing through a chemical vapor deposition method using a carbon precursor comprising acetylene, ethylene, propylene, ethanol, or a combination thereof.

10. The method of claim 6, wherein
depositing of the carbon comprises additionally supplying a nitrogen precursor and/or a sulfur precursor.

11. The method of claim 10, wherein
the nitrogen precursor comprises ammonia, methyl amine, ethyl amine, propyl amine, butyl amine, acetonitrile, pyrrole, pyridine, or a combination thereof, and
the sulfur precursor comprises hydrogen sulfide, thiophene, thiophenol, mercaptoethanol, thioacetic acid, methyl mercaptan, ethyl mercaptan, propyl mercaptan, butyl mercaptan, or a combination thereof.

12. The method of claim 6, wherein
the method further comprises heat-treating the carbon-zeolite composite before removing the zeolite.

13. The method of claim 12, wherein
the heat-treating is performed at a temperature range of about 773 K to about 1323 K.

14. The method of claim 6, wherein
the leaching solution comprises HCl, NaOH, KOH, HF, NaF, $NH_4F$, $AlF_3$, or a combination thereof.

* * * * *